(12) United States Patent
Fagiolini

(10) Patent No.: US 6,171,567 B1
(45) Date of Patent: Jan. 9, 2001

(54) PROCESS FOR THE PURIFICATION OF A GAS CONTAINING HYDROGEN CHLORIDE

(75) Inventor: Nilo Fagiolini, Rosignano-Solvay (IT)

(73) Assignee: Solvay (Societe Anonyme), Brussels (BE)

( * ) Notice: Under 35 U.S.C. 154(b), the term of this patent shall be extended for 0 days.

(21) Appl. No.: 08/676,328

(22) PCT Filed: Jan. 12, 1995

(86) PCT No.: PCT/EP95/00116

§ 371 Date: Sep. 6, 1996

§ 102(e) Date: Sep. 6, 1996

(87) PCT Pub. No.: WO95/19835

PCT Pub. Date: Jul. 27, 1995

(30) Foreign Application Priority Data

Jan. 20, 1994 (IT) .............................................. MI94A0078

(51) Int. Cl.$^7$ .............................. F23J 15/02; B01D 53/68
(52) U.S. Cl. ....................................... 423/240 S; 110/345
(58) Field of Search ............................... 423/422, 240 S, 423/240 R; 252/192; 110/345

(56) References Cited

U.S. PATENT DOCUMENTS

| | | | |
|---|---|---|---|
| 3,589,863 | 6/1971 | Frevel et al. | 423/540 |
| 4,555,391 | 11/1985 | Cyran et al. | 423/244.07 |
| 4,588,569 | 5/1986 | Cyran et al. | 423/244.08 |
| 4,767,605 * | 8/1988 | Lindbauer | 423/240 S |
| 4,844,915 * | 7/1989 | Hooper | 423/235 |
| 4,960,445 | 10/1990 | Helfritch | 423/244.08 |
| 4,990,188 * | 2/1991 | Micek | 106/36 |
| 5,411,750 * | 5/1995 | Lajoie | 424/717 |
| 5,424,077 * | 6/1995 | Lajoie | 241/5 |
| 5,478,447 * | 12/1995 | Ninane | 423/179 |

FOREIGN PATENT DOCUMENTS

| | | |
|---|---|---|
| 0161497 | 11/1985 | (EP) . |
| 0301272 | 2/1989 | (EP) . |
| 0463367 | 1/1992 | (EP) . |
| 86/05714 | 10/1986 | (WO) . |
| 88/00672 | 1/1988 | (WO) . |
| 91/08282 * | 6/1991 | (WO) . |
| 93/04983 | 3/1993 | (WO) . |

OTHER PUBLICATIONS

Solvay & Cie S.A., brochure TR. 895/5c–B–1–1290. "Sodium Bicarbonate Purification of flue gases". (No Date).

Kirk–Othmer, Encyclopedia of Chemical Technology, vol. 21, 1983, p. 157. Silver and Silver Alloys to Sulfolanes and Sulfones.

Church and Dwight Technical Disclosure on "Sodium Bicarbonate", from Internet World–Wide–Web site http://www.ahperformance.com. No date.*

* cited by examiner

Primary Examiner—Steven P. Griffin
Assistant Examiner—Peter Di Mauro
(74) Attorney, Agent, or Firm—Venable

(57) ABSTRACT

Solid powdered reactive composition for the purification of a gas containing hydrogen chloride, the said reactive composition comprising more than 98% by weight of sodium bicarbonate and less than 2% by weight of sodium monocarbonate and exhibiting a particle size distribution defined by an average particle diameter of less than 0.050 mm and a particle size slope of less than 5.

The reactive composition finds an application in the purification of flue gases from the incineration of household waste.

14 Claims, 3 Drawing Sheets

PROCESS FOR THE PURIFICATION OF A GAS CONTAINING HYDROGEN CHLORIDE

The invention relates to the purification of gases containing hydrogen chloride.

It more particularly relates to a reactive composition based on sodium bicarbonate which can be used for purifying a gas from hydrogen chloride.

Incineration is a technology which is increasingly necessary for the disposal of household or municipal waste. The incineration of household waste is accompanied by the formation of smoke generally containing hydrogen chloride. It is imperative to remove the hydrogen chloride from the smoke before discharging the latter to the atmosphere.

A known process for purifying smoke containing hydrogen chloride consists in treating the smoke with sodium bicarbonate, so as to decompose the hydrogen chloride and to form sodium chloride.

A process has more particularly been provided in which sodium bicarbonate is injected in the form of a powder into the smoke exiting from the incinerator and the smoke, thus treated, is then conveyed to a filter (Solvay & Cie, brochure TR. 895/5c-B-1-1290). In this known process, the smoke is at a temperature of 260° C. at the point of injection of the sodium bicarbonate. The latter is used in the form of a graded powder, obtained by milling, of which 90% by weight is in the form of particles with a diameter of less than 16 $\mu$m.

In practice, the sodium bicarbonate powder used in this known process contains sodium monocarbonate.

It has now been found that it is possible to optimize the efficiency of the known process which has just been described by selecting sodium bicarbonate of well-defined quality.

The invention consequently relates to a solid powdered reactive composition for the purification of a gas containing hydrogen chloride, the said reactive composition comprising more than 98% by weight of sodium bicarbonate and less than 2% by weight of sodium mono-carbonate and exhibiting a particle size distribution defined by an average particle diameter of less than 0.050 mm and a particle size slope of less than 5.

In the reactive composition according to the invention, the sodium bicarbonate and the sodium mono-carbonate are regarded as in the anhydrous state.

According to the invention, the reactive composition comprises more than 98% (preferably at least 99%) by weight of sodium bicarbonate and less than 2% (preferably at most 1%) by weight of sodium mono-carbonate. It can also comprise other impurities commonly found in commercial sodium bicarbonate, in particular sodium chloride.

The reactive composition according to the invention is a powdered solid. An important characteristic of the reactive composition according to the invention lies in its particle size distribution which is characterized by an average particle diameter $D_m$ of less than 0.050 mm (preferably at most equal to 0.030 mm) and a particle size slope $\sigma$ of less than 5 (preferably at most equal to 3).

In the reactive composition according to the invention, the average diameter $D_m$ and the particle size slope $\sigma$ are defined by the following relationships $$D_m = \frac{\sum n_i \cdot D_i}{\sum n_i}, \sigma = \frac{D_{90} - D_{10}}{D_{50}}$$

in which $n_i$ denotes the frequency (by weight) of the particles with diameter $D_i$, and $D_{90}$ ($D_{50}$ and $D_{10}$ respectively) represents the diameter at which 90% (50% and 10% respectively) of the particles of the reactive composition (expressed by weight) have a diameter of less than $D_{90}$ ($D_{50}$ and $D_{10}$ respectively). These particle size parameters are defined by the method of analysis by diffraction of laser beams using a Sympatec model Helos 12LA measuring device manufactured by Sympatec GmbH.

The reactive composition according to the invention is especially intended for the purification of smoke originating from furnaces for the incineration of household waste. This smoke generally contains, in addition to hydrogen chloride, sulphur dioxide. It has been observed that the reactive composition according to the invention efficiently purifies the smoke, both from hydrogen chloride and from sulphur dioxide.

In the reactive composition according to the invention, the sodium bicarbonate is the main active compound. The sodium carbonate content and the particle size distribution are, moreover, two interdependent parameters. On the one hand, it has been observed that, everything else being equal, an excessive sodium carbonate content tends to cause the particles of the reactive composition to stick together, reducing the efficiency of the composition. On the other hand, the particle size distribution of the reactive composition has to be a compromise, as it is known that a fine particle size will promote the reaction with the hydrogen chloride in the treated gas, whereas a coarse particle size will promote the subsequent separation of the solid reaction products. In practice, reactive compositions which are especially recommended are those in which the sodium bicarbonate content by weight is from 99 to 99.9%, the sodium monocarbonate content by weight is from 0.1 to 1%, the average particle diameter is from 0.010 to 0.030 mm and the particle size slope is from 1 to 3. The optimum values of the particle size parameters are related to the means used to separate the solid products from the reaction of the reactive composition with the hydrogen chloride and, if appropriate, the sulphur dioxide in the treated gas. In fact, it has proved to be the case that these reaction products have a particle size distribution which is directly related to that of the reactive composition.

An embodiment of the reactive composition according to the invention, which is especially suited to the specific case where an electrostatic filter is used as means for separating the abovementioned reaction products, is that in which the average particle diameter is from 0.020 to 0.030 mm and the particle size slope is from 1.25 to 2.50. A preferred alternative form of this embodiment of the invention is that in which at least 90% by weight of the particles have a diameter equal to or less than 0.055 mm and at most 10% by weight have a diameter of less than 0.006 mm.

Another embodiment of the reactive composition according to the invention, especially suited to the specific case where a filter of the filter-cloth type (for example a bag filter) is used as means for mechanical separation of the abovementioned reaction products, is that in which the average particle diameter is from 0.010 to 0.020 mm and the particle size slope is from 1 to 3. A preferred alternative form of this other embodiment of the invention is that in which at least 90% by weight of the particles have a diameter equal to or less than 0.035 mm and at most 10% by weight have a diameter of less than 0.005 mm.

The reactive composition according to the invention is generally obtained by milling a coarse commercial sodium bicarbonate powder. The composition of the powder and its particle size grading play an important role in the quality of the reactive composition according to the invention.

According to an especially recommended embodiment of the reactive composition according to the invention, the latter is obtained by milling a powder which comprises more than 98% (preferably at least 99%) by weight of sodium bicarbonate and less than 2% (preferably at most 1%) by weight of sodium monocarbonate and which exhibits a particle size distribution such that at least 85% by weight of its particles have a diameter of less than 0.500 mm and such that at most 25% by weight of its particles have a diameter of less than 0.040 mm. In accordance with a preferred alternative form of this embodiment of the invention, the powder used for the milling exhibits a particle size distribution such that, per 100 units by weight of its particles, 85 units have a diameter of less than 0.250 mm, from 50 to 70 units have a diameter of less than 0.125 mm, from 30 to 50 units have a diameter of less than 0.090 mm and less than 25 units have a diameter of less than 0.045 mm.

In the especially recommended embodiment which has just been described, the milling conditions are an important parameter. In particular, it is important to adjust the milling in order to avoid excessive or untimely thermal decomposition of the sodium bicarbonate in the powder under the effect of the heat given off by the milling. The optimum milling parameters are directly related to other parameters, such as the mill used, the particle size grading of the powder subjected to the milling and its sodium bicarbonate and monocarbonate contents, the particle size distribution desired for the reactive composition according to the invention and its sodium bicarbonate and monocarbonate contents. In practice, the optimum milling parameters can easily be determined in each specific case by routine laboratory work.

Everything else being equal, the reactive composition according to the invention exhibits optimum efficiency as reactant for the purification of smoke from hydrogen chloride and, if appropriate, from sulphur dioxide. This efficiency is revealed by the excess reactive composition necessary to decompose a defined fraction of the hydrogen chloride and of the sulphur dioxide in the gas, with respect to the stoichiometric amount.

The reactive composition according to the invention finds an advantageous application in the purification of the flue gases from the incineration of household waste.

The invention consequently also relates to a process for the purification of smoke containing hydrogen chloride, according to which a reactive composition in accordance with the invention, containing sodium bicarbonate, is introduced into the smoke at a temperature of 125 to 600° C. and the smoke is then subjected to dust removal.

In the process according to the invention, the reactive composition is introduced in the solid form into the smoke. In general, the reactive composition is introduced into the stream of the smoke moving within a reaction chamber. In the latter, the sodium bicarbonate decomposes the hydrogen chloride of the smoke with the formation of sodium chloride. The removal of dust from the smoke has the function of extracting therefrom the sodium chloride particles formed. It can be carried out by any known appropriate means, for example by mechanical separation in a cyclone, by filtration through a filter cloth or by electrostatic separation. In the implementation of the process according to the invention, it is necessary to provide sufficient time for reaction of the sodium bicarbonate with the hydrogen chloride in the smoke, before subjecting the latter to dust removal. In practice, it has proved advantageous to carry out dust removal more than 2 seconds (preferably within a time of 2.5 to 6 seconds) after the end of introduction of the reactive composition into the smoke.

The process according to the invention finds an especially advantageous application in the purification of smoke originating from the incineration of household waste. In this specific application of the process according to the invention, the solid product collected from the dust removal generally comprises, in addition to sodium chloride, sodium sulphate, polyvalent metals in the metallic or combined state, and sodium carbonate. This solid product can be treated in the way set out in International Patent Application WO 93/04983 [Solvay (SociétéAnonyme)].

Distinctive features and details of the invention will emerge from the following description of the appended drawings.

Figure 1:
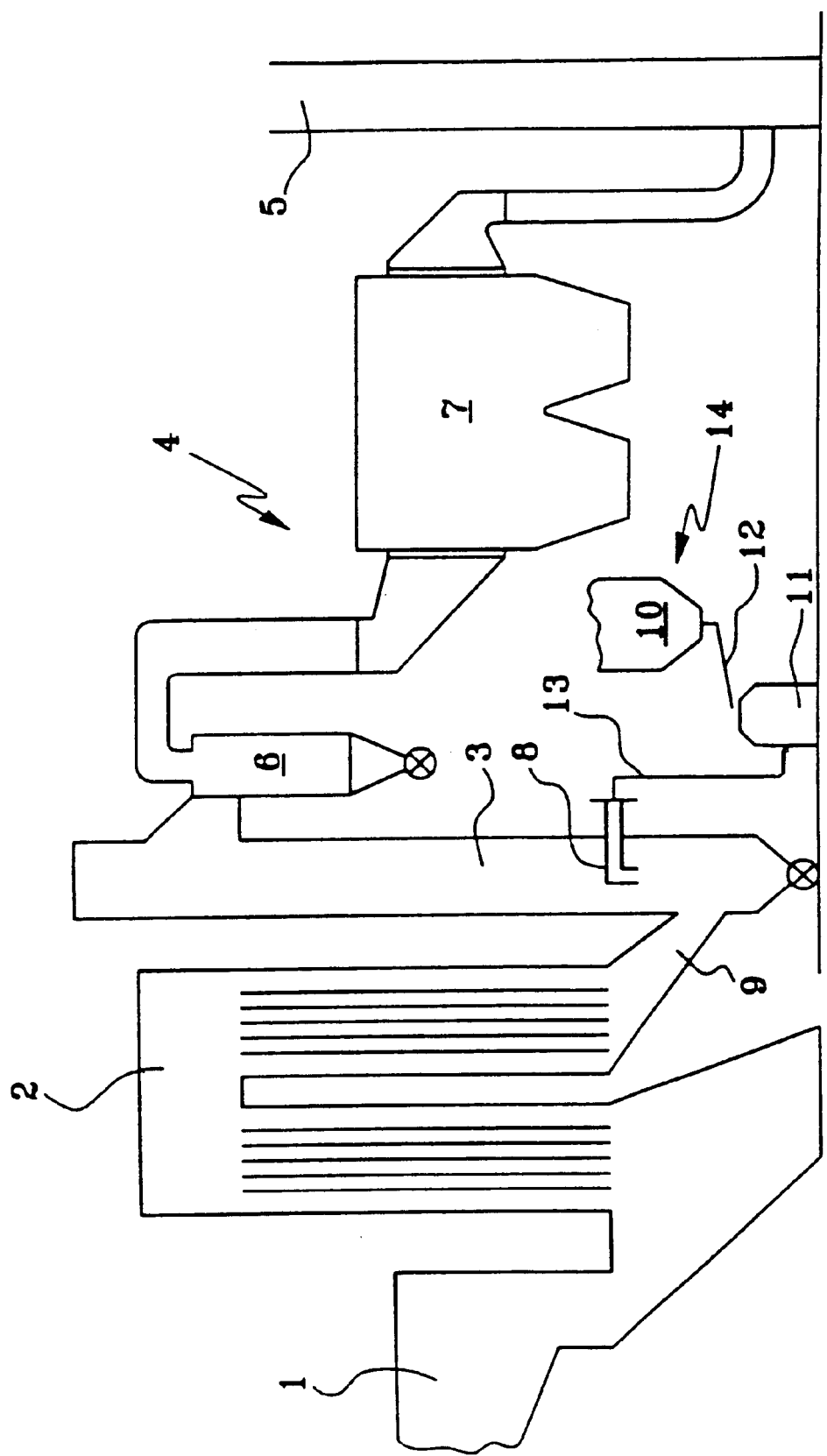
FIG. 1 diagrammatically shows a plant for the incineration of household waste which makes use of the process according to the invention.

The incineration plant represented in FIG. 1 comprises an incineration furnace 1 (shown in part), a recovery boiler 2, a vertical tubular reaction chamber 3, a dust-removal device 4 and a chimney 5. The dust-removal device 4 comprises a cyclone 6, followed by an array 7 of electrostatic filters. As an alternative, the plant can comprise a filter-cloth filter, for example a bag filter, as a replacement for or downstream of the array of electrostatic filters 7.

The reaction chamber 3 is equipped with an injector 8 connected to a device 14 for supplying a reactive composition.

During the operation of the plant in FIG. 1, the incineration furnace 1 generates smoke laden with hydrogen chloride, with sulphur dioxide and with various gaseous and solid impurities, including heavy metals. This smoke leaves the furnace 1, passes through the boiler 2, in which part of its substantial heat is recovered, and then emerges, via a flue 9, into the lower part of the reaction chamber 3, below the injector 8. The injector 8 is, moreover, supplied with a powdered reactive composition in accordance with the invention originating from the supply device 14, the operation of which will be clarified below. Thus, the smoke is treated in the chamber 3 with the reactive composition originating from the injector 8, the result of which is the decomposition of the hydrogen chloride and the sulphur dioxide in the smoke with the formation of particles of sodium chloride and of sodium sulphate. On its departure from the reaction chamber 3, the smoke passes into the dust-removal device 4, where the solid matter which it contains, in particular the heavy metals and the sodium chloride and the sodium sulphate formed in the reaction chamber 3, are separated. The purified smoke is then transferred as is to the chimney 5.

The reactive composition used to supply the injector 8 originates from the supply device 14. The latter comprises a silo 10 containing a commercial sodium bicarbonate powder and a mill 11 supplied from the silo 10 via the vibrating distributor 12. The mill 11 is of the attrition type, in which the attrition energy is imparted to the material to be milled via a stream of air (Kirk-Othmer, Encyclopedia of Chemical Technology, Volume 21, 1983, page 157). The mill contains a sieving device. It is connected to the injector 8 via a pipe 13.

The following examples serve to illustrate the invention.

EXAMPLE 1

Household waste was incinerated in an industrial plant of the type of that described above, with reference to FIG. 1.

On its departure from the incineration furnace, the smoke exhibited the following characteristics:

Composition by weight (mg/Nm³):
HCl: 1300
SO₂: 200
Temperature: 250° C.
Flow rate: 3500 Nm³/h Moreover, a commercial sodium bicarbonate powder was used which exhibited the following characteristics:
to obtain a reactive composition exhibiting the particle size distribution represented in FIG. 2 and the following composition by weight:

$NaHCO_3$: >99%
$Na_2CO_3$: <1%

Figure 2:
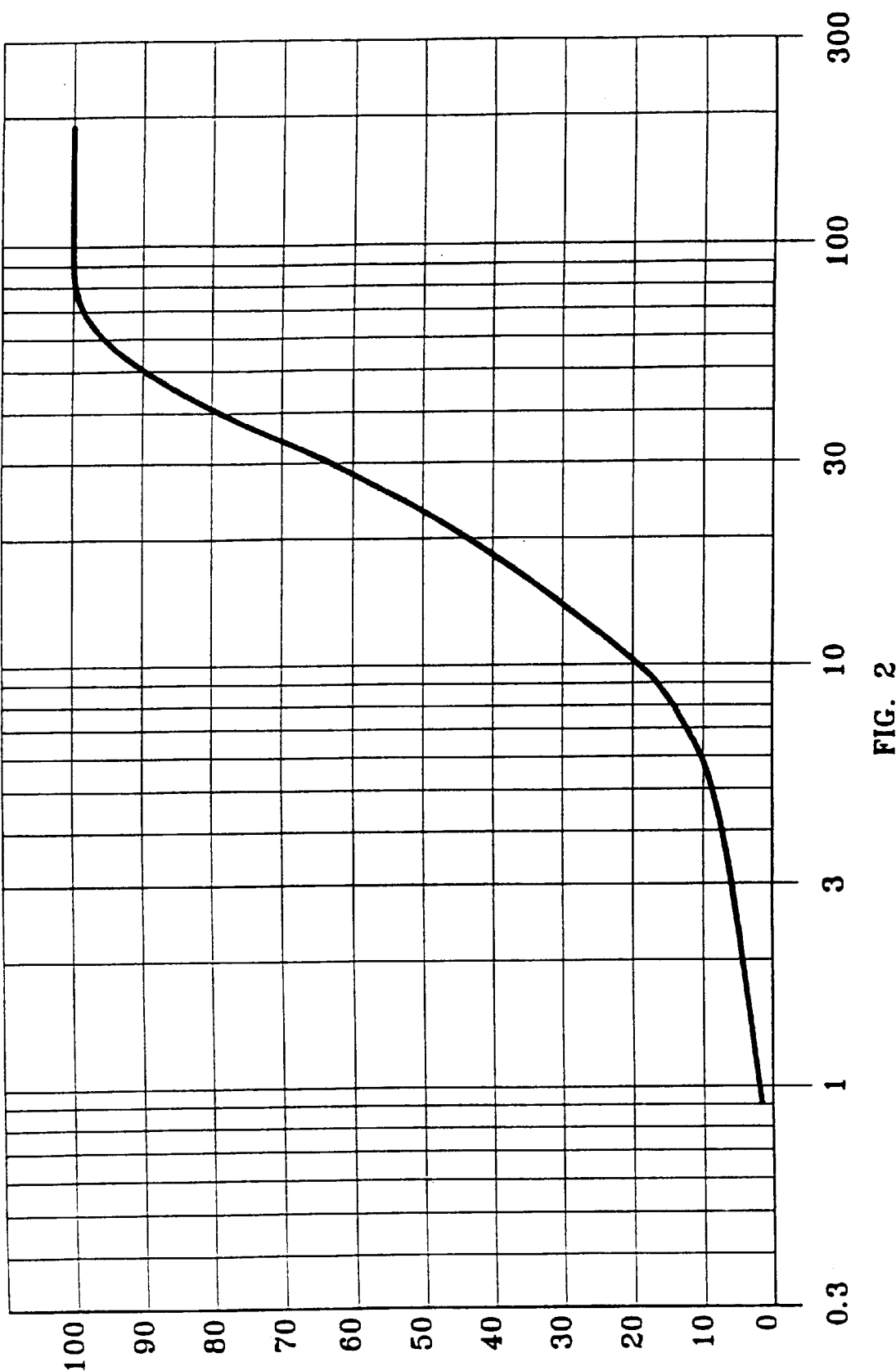
FIGS. 2 and 3 are two diagrams which reproduce the cumulative particle size distributions of two specific embodiments of the reactive composition according to the invention.

The cumulative particle size distribution of the reactive composition collected from the mill is reproduced in FIG. 2. In this figure, the scale of the abscissae represents the diameter of the particles, expressed in microns, and the scale of the ordinates represents the cumulative fraction by weight, expressed as % of the sieved material.

The reactive composition collected from the milling was immediately injected as is into the smoke, with a flow rate substantially corresponding to 1.6 mol of $NaHCO_3$ per mole of ($HCl+SO_2$) in the smoke. Dust was then removed from the treated smoke on an electrostatic filter.

The composition of the smoke after the purification treatment and dust removal was analyzed:
HCl: 20 mg/Nm³
SO₂: 10 mg/Nm³

EXAMPLE 2

Figure 3:
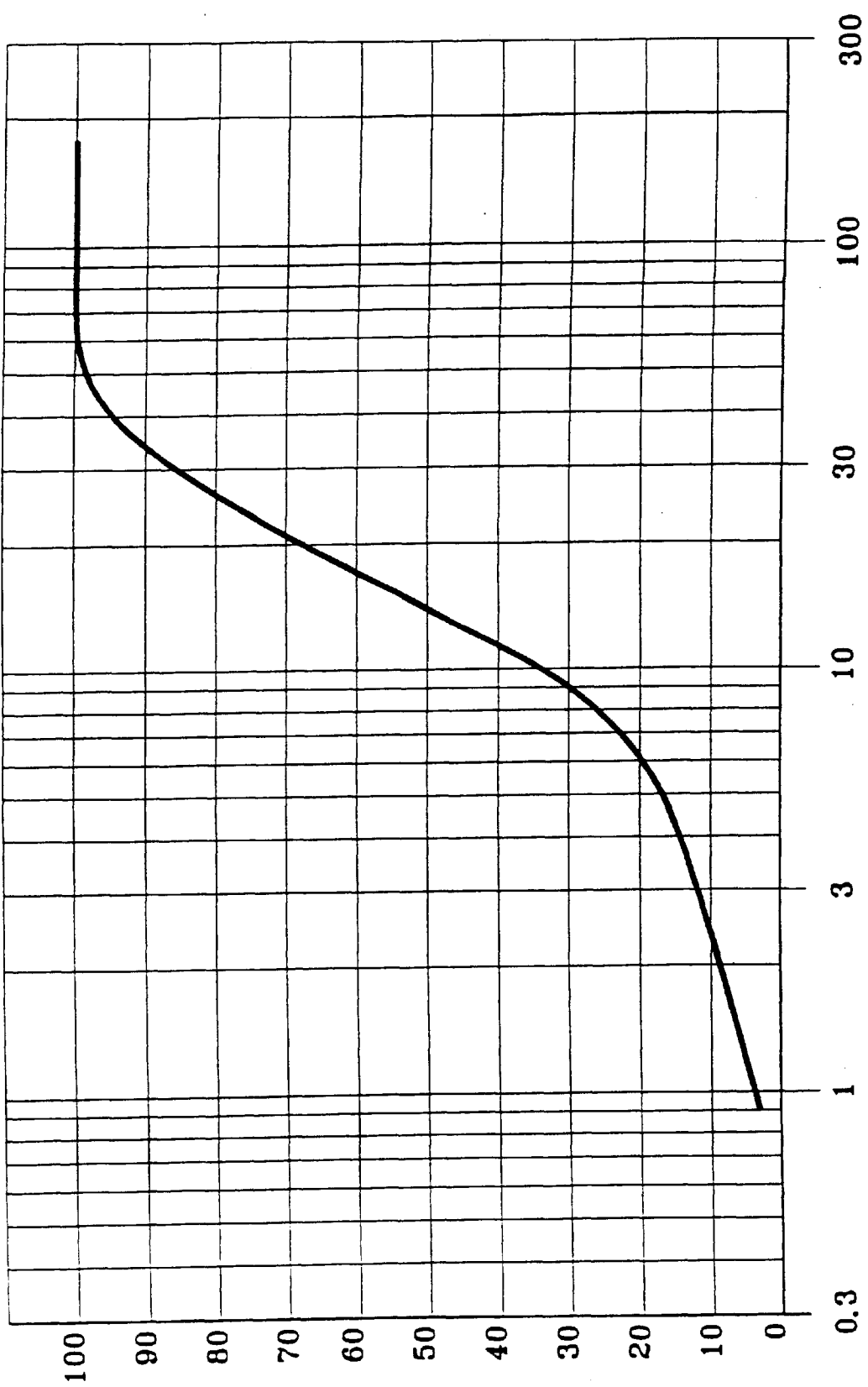

The test of Example 1 was repeated with smoke exhibiting the following characteristics at the outlet of the incineration furnace:

Composition by weight (mg/Nm³):
HCl: 647
SO₂: 100
Temperature: 167° C.
Flow rate: 36000 Nm³/h The same commercial sodium bicarbonate powder was used as in Example 1. The milling conditions for the powder were, however, modified so as to obtain a reactive composition exhibiting the cumulative particle size distribution represented in FIG. 3 (the scales of the abscissae and of the ordinates are identical to those in FIG. 2) and the following composition by weight:

$NaHCO_3$: >99%
$Na_2CO_3$: <1%

The reactive composition collected from the milling was immediately injected as is into the smoke, with a flow rate substantially corresponding to 1.2 mol of $NaHCO_3$ per mole of ($HCl+SO_2$) of the smoke. Dust was then removed from the treated smoke on a filter-cloth filter.

The composition of the smoke after the purification treatment and dust removal was analyzed:
HCl: 5 mg/Nm³
SO₂: <10 mg/Nm³

What is claimed is:

1. Process for purification of smoke containing hydrogen chloride, which comprises the steps of introducing into the smoke a powdery reactive composition comprising at least 99% by weight sodium bicarbonate and at most 1% by weight sodium monocarbonate and exhibiting a particle size distribution defined by an average particle diameter of from 0.020 to 0.030 mm and a particle size slope of from 1 to 3, and subjecting the smoke to dust removal.

2. Process according to claim 1, characterized in that the dust removal comprises an electrostatic separation and in that the reactive composition which is introduced into the smoke has an average particle diameter from 0.020 to 0.030 mm and a particle size slope from 1.25 to 2.50.

3. Process according to claim 1, characterized in that the dust removal comprises a filtration through a filter cloth.

4. Process according to claim 1, characterized in that the removal of dust from the smoke is carried out more than 2 seconds after the end of introduction of the reactive composition into the smoke.

5. Process according to claim 4, characterized in that the time elapsed between the end of introduction of the reactive composition into the smoke and the dust removal is from 2.5 to 6 seconds.

6. The process according to claim 1, wherein the sodium bicarbonate content by weight is from 99 to 99.9% and the sodium monocarbonate content by weight is from 0.1 to 1%.

7. The process according to claim 1, wherein the particle size slope is from 1.25 to 2.50.

8. The process according to claim 1, wherein the composition comprises particles of which at least 90% by weight have a diameter equal to or less than 0.055 mm and of which at most 10% by weight have a diameter of less than 0.006 mm.

9. The process according to claim 1, wherein the composition exhibits the cumulative particle size distribution represented in FIG. 2.

10. The process according to claim 1, wherein the composition is composed of particles of which at least 90% by weight have a diameter equal to or less than 0.035 mm and of which at most 10% by weight have a diameter of less than 0.005 mm.

11. The process according to claim 1, wherein the composition exhibits the particle size distribution represented in FIG. 3.

12. The process according to claim 1, wherein the particle size distribution is obtained by milling a powder which comprises at least 99% by weight of sodium bicarbonate and at most 1% by weight of sodium monocarbonate and which exhibits a particle size distribution such that at least 85% by weight of its particles have a diameter of less than 0.500 mm and such that at most 25% by weight of its particles have a diameter of less than 0.040 mm.

13. The process according to claim 1, wherein the composition exhibits a particle size distribution such that, per 100 units by weight of particles, 85 units have a diameter of less than 0.250 mm, from 50 to 70 units have a diameter of less than 0.125 mm, from 30 to 50 units have a diameter of less than 0.090 mm and less than 25 units have a diameter of less than 0.045 mm.

14. The process according to claim 1, wherein the smoke is flue gas from the incineration of household waste.

* * * * *